March 4, 1969 KENJI SENO ET AL 3,431,403

READOUT CONTROL SYSTEM FOR PERFORATED TAPE

Filed July 29, 1965 Sheet 1 of 2

United States Patent Office 3,431,403
Patented Mar. 4, 1969

3,431,403
READOUT CONTROL SYSTEM FOR
PERFORATED TAPE
Kenji Seno, Koichi Nozawa, and Nobuyuki Tanaka,
Kawasaki, and Hideyuki Kikuchi, Yokohama, Japan,
assignors to Fujitsu Limited, Kawasaki, Japan, a corporation of Japan
Filed July 29, 1965, Ser. No. 475,690
Claims priority, application Japan, July 31, 1964,
39/43,715
U.S. Cl. 235—61.11                 9 Claims
Int. Cl. G06k 7/00

The present invention relates to a readout control system. More particularly, the invention relates to a readout control system for perforated tape.

When a perforated tape is utilized in, for example, a computer or computer operation, the tape must be read out at each code character. When the characters of the perforated tape are read out continuously in a system in which the start magnet is operated, actuated or energized until the last character of the tape is read out, the start magnet is released, deactuated or deenergized after the last character is read out and the stop magnet is simultaneously operated, actuated or energized. In such operation, the start magnet may be utilized to feed or move the perforated tape at its standard substantially continuous speed.

When a perforated tape is read out character by character in a system in which the stop magnet is operated upon the readout of a character, and after the character is read out the stop magnet is released, and the start magnet is simultaneously operated, and this is repeated for each character, if the tape is fed or moved at its standard substantially continuous speed the mechanical components of the readout system and of the mechanism vibrate and are damaged and cause errors in the readout each time the start and stop magnets are operated and released.

In a readout system of known type, in order to avoid the aforementioned difficulties, after the stop magnet is operated, the readout of the next succeeding character is delayed for a determined time interval. This reduces the substantial readout speed to 25% of the readout speed for a continuously moving tape.

The principal object of the present invention is to provide a new and useful readout control system for perforated tape.

An object of the present invention is to provide a readout control system for readout of perforated tape at very much higher speed than a character by character readout system.

Another object of the present invention is to provide a readout control system for readout of perforated tape with stability and substantially without vibration in the manner of a continuous readout system.

In accordance with the present invention, a readout control system for a perforated tape having characters perforated therein comprises a start magnet positioned in operative proximity with the perforated tape for moving the tape when an operation pulse is supplied thereto. A stop magnet is positioned in operative proximity with the perforated tape for stopping the tape when an operation pulse is supplied thereto. Each of the start magnet and the stop magnet has an operation allowance time commencing when an operation pulse is supplied to the magnet and extending for a determined duration, which operation allowance time is required for complete operation of the magnet. Readout means positioned in operative proximity with the perforated tape produces a readout operation pulse and reads out characters perforated in the perforated tape. Operation pulse supplying means selectively supplies an operation pulse to one of the start and stop magnets at a time. Control means connected to the operation pulse supplying means controls the supply of operation pulses to the magnets to immediately terminate an operation pulse supplied to the stop magnet and to supply an operation pulse to the start magnet and permit operation of the readout means to simultaneously read out a character in the perforated tape when a readout operation pulse is produced by the readout means during the operation allowance time of the stop magnet after an operation pulse supplied to the start magnet is terminated and an operation pulse is supplied to the stop magnet, and to supply an operation pulse to the start magnet and permit operation of the readout means to simultaneously read out a character in the perforated tape after the expiration of a determined period of time after the expiration of the operation allowance time of the stop magnet when a readout operation pulse is produced by the readout means after the expiration of the operation allowance time.

In accordance with the present invention, a method for readout control of a perforated tape having characters perforated therein comprises the steps of positioning a start magnet in operative proximity with the perforated tape for moving the tape when an operation pulse is supplied thereto; positioning a stop magnet in operative proximity with the perforated tape for stopping the tape when an operation pulse is supplied thereto, each of the start magnet and the stop magnet having an operation allowance time commencing when an operation pulse is supplied to the magnet and extending for a determined duration, which operation allowance time is required for complete operation of the magnet; producing a readout operation pulse and reading out characters perforated in the perforated tape; selectively supplying an operation pulse to one of the start and stop magnets at a time; and controlling the supply of operation pulses to the magnets to immediately terminate an operation pulse supplied to the stop magnet and to supply an operation pulse to the start magnet and permit simultaneous readout of a character in the perforated tape when a readout operation pulse is produced during the operation allowance time of the stop magnet after an operation pulse supplied to the start magnet is terminated and an operation pulse is supplied to the stop magnet and to supply an operation pulse to the start magnet and permit simultaneous readout of a character in the perforated tape after the expiration of a determined period of time after the expiration of the operation allowance time of the stop magnet when a readout operation pulse is produced after the expiration of the operation allowance time.

In order that the present invention may be readily carried into effect, it will now be described with reference to the accompanying drawings, wherein.

Figure 1:
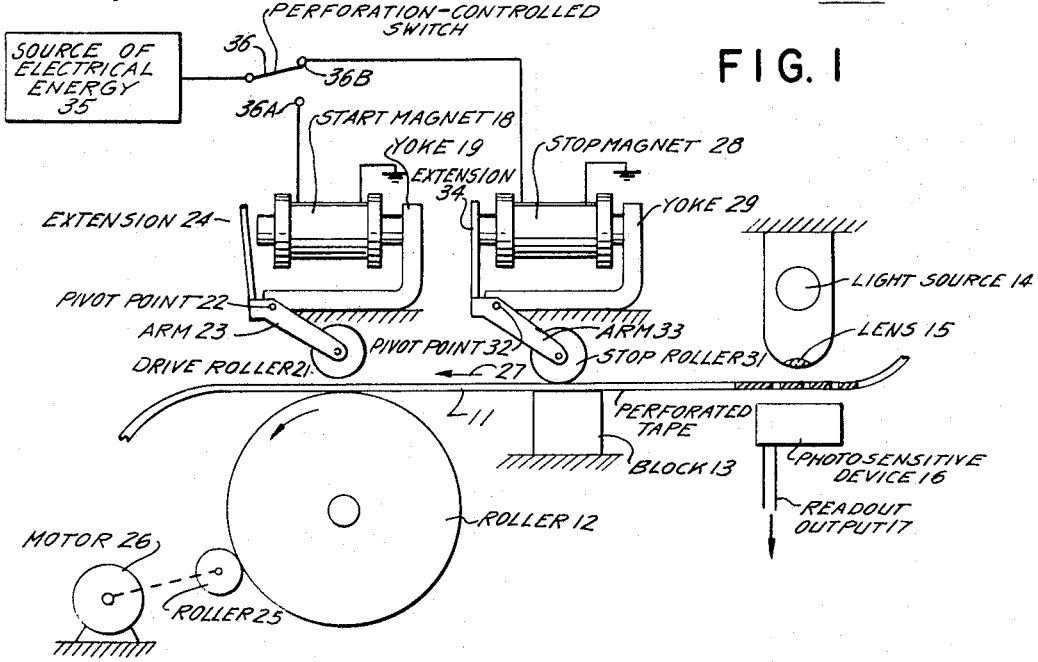
FIG. 1 is a schematic diagram of an embodiment of a movement control and readout system for a perforated tape.

In FIG. 1, a perforated tape 11 is supported by any suitable means including, for example, a roller 12 and a block 13, positioned under said tape. The roller 12 is rotatably mounted for rotation about its axis in, for example, a counterclockwise direction. The block 13 is fixedly positioned. A suitable readout system such as, for example, a source of light 14 and a directing lens 15 positioned in operative proximity with the perforated tape 11 above said tape and a photosensitive device 16 positioned in operative proximity with said tape below said tape, is provided. The photosensitive device 16 functions as a readout head and provides readout signals via its output 17. The readout system comprises known components functioning in known manner.

A start magnet 18 is suitably supported in operative proximity with the upper surface of the tape 11. The start magnet 18 includes a yoke 19 and a drive roller 21 pivotally affixed to said yoke at a pivot point 22 on an arm 23 in such a manner that a magnetizable extension or armature 24 of said arm is attracted to said magnet when said magnet is energized, opearted or actuated. When the armature or extension 24 of the arm 23 is attracted to the magnet 18, said arm is pivotally rotated in a clockwise direction about the pivot point 22 and the drive roller 21 comes into contact with and remains in contact with the upper surface of the perforated tape 11 during the energization of said magnet.

The roller 12 is preferably rotated in a counterclockwise direction by any suitable driving device such as, for example, a roller 25 contacting the peripheral surface of said roller 12 and driven by a motor 26. Thus, when the drive roller 21 contacts the perforated tape 11, said tape is fed or moved in the direction of an arrow 27.

When the start magnet 18 is deenergized, deactuated or released, the extension 24 of the arm 23 is repelled by said magnet and moves to the position shown in FIG. 1. When the extension 24 of the arm 23 is repelled by the magnet 18, said arm is pivotally rotated about the pivot point 22 in a counterclockwise direction and the drive roller 21 is removed from contact with and remains spaced from the upper surface of the perforated tape 11 during the deenergization of said magnet.

A stop magnet 28 is suitably supported in operative proximity with the upper surface of the tape 11. The stop magnet 28 includes a yoke 29 and a stop roller 31 pivotally affixed to said yoke at a pivot point 32 on an arm 33 in such a manner that a magnetizable extension or armature 34 of said arm is attracted to said magnet when said magnet is energized, operated or actuated. When the armature or extension 34 of the arm 33 is attracted to the magnet 28, said arm is pivotally rotated in a clockwise direction about the pivot point 32 and the stop roller comes into contact with and remains in contact with the upper surface of the perforated tape 11 during the energization of said magnet, as shown in FIG. 1. When the stop roller 31 contacts the perforated tape 11, it presses said tape against the block 13 and stops the movement of said tape.

When the stop magnet 28 is deenergized, deactuated or released, the extension 34 of the arm 33 is repelled by said magnet. When the extension 34 of the arm 33 is repelled by the magnet 28, said arm is pivotally rotated about the pivot point 32 in a counterclockwise direction and the stop roller 31 is removed from contact with and remains spaced from the upper surface of the perforated tape during the deenergization of said magnet.

At any time, either the start magnet 18 or the stop magnet 28 is energized. Whenever the start magnet 18 is energized, the stop magnet 28 is deenergized, and whenever the start magnet is deenergized, the stop magnet is energized. This is due to the movement control system, which may comprise any suitable known circuitry for controlling the energization and deenergization of the energizing coils or windings of the start and stop magnets 18 and 28. Thus, for example, a suitable source of electrical energy 35 produces an energizing current for the magnets 18 and 28, which current may be supplied via a two-position switch 36 to one or the other of said magnets.

When the switch 36 makes electrical contact with a contact 36A, the start magnet 18 is energized and the stop magnet 28 is deenergized. When the switch 36 makes electrical contact with a contact 36B, the start magnet 18 is deenergized and the stop magnet 28 is energized, as shown in FIG. 1. The switch 36 is controlled by the perforations in the tape 11 in any suitable manner, so that when a character perforated in said tape appears at the readout head 16, the start magnet 18 is deenergized and the stop magnet 28 is energized.

In a known readout system, after the perforated tape 11 is stopped, when the start magnet 18 is released and the stop magnet 28 is operated, the mechanical components vibrate to such a great extent that they are damaged and cause errors in the readout. Even if the signal for the readout of the character occurs within the period of vibration of the components immediately following the stop pulse for stopping the perforated tape, in the known system the start pulse for starting the feeding of the perforated tape always occurs after the termination of the period of vibration and the tape is read out at the time that the start pulse occurs. The start pulse operates the start magnet, which then moves or feeds the perforated tape to the next succeeding character position, at which position the stop magnet is operated to stop the tape, the start magnet being released. In such system, wherein the stop magnet is operated each time a character is read out, the feed speed of the perforated tape is very low and the life of each of the magnets is considerably reduced due to their heavy use.

Generally, the operating characteristic of a magnet is such that even if an operation, actuating or energizing pulse is supplied to the energization winding of the magnet, the armature 24 or the armature 34 does not complete its movement under the attractive force of the magnet immediately, but only after the elapse of a determined time interval. This determined time interval is the operation allowance time or energization control time and commences to run when the operation, actuating or energizing pulse is supplied to the energization winding of the magnet. If the operation pulse is interrupted during the operation allowance time, the armature does not complete its movement.

In accordance with the present invention, the read-out control system uses the operation allowance time of the magnet to advantage. This is illustrated in FIGS. 2 and 3, which are a line representation of the operation of the perforated tape readout control system of the present invention in one situation and in another situation, respectively.

Figure 2:
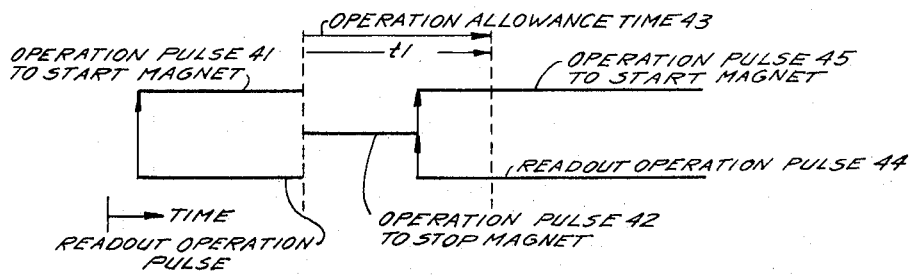
FIG. 2 is a line representation of the operation of the perforated tape readout control system of the present invention in one situation.

In FIG. 2, the situation illustrated is one in which the operation pulse 41 supplied to the start magnet 18 is terminated or interrupted and an operation pulse 42 is supplied to the stop magnet 28. The operation allowance time 43 of the stop magnet 28 commences to run when the operation pulse 42 is supplied to said stop magnet and the readout operation pulse 44 is provided during the period or duration $t1$ of the operation allowance time 43. An operation pulse 45 is then immediately supplied to the start magnet 18 and the character is simultaneously read out from the perforated tape. In this situation, the operation pulse 41 supplied to the start magnet 18 is interrupted or terminated and the operation pulse 42 is supplied to the stop magnet 28, but since the duration of the operation pulse 42 supplied to the stop magnet is limited to remain within the operation allowance time 43, the entire readout operation is substantially the same as if the start magnet operates continuously.

Figure 3:
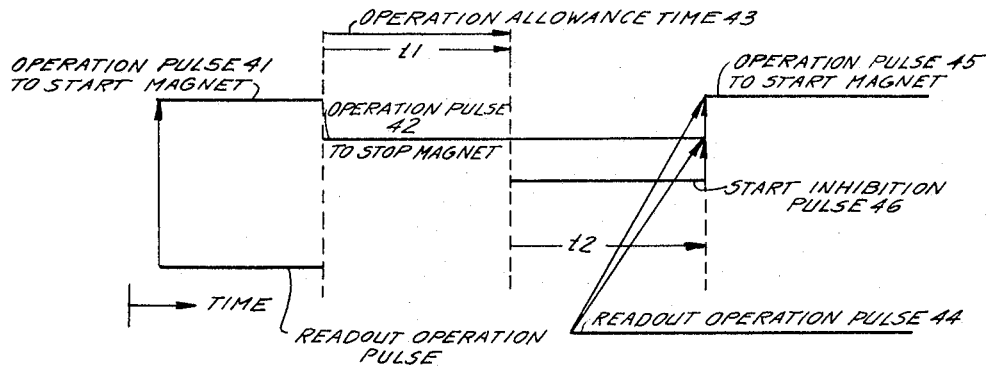
FIG. 3 is a line representation of the operation of the perforated tape readout control system of the present invention in another situation.

In FIG. 3, the situation illustrated is one in which the operation pulse 41 to the start magnet 18 has been terminated and the operation pulse 42 has been supplied to the stop magnet 28 and continues after the expiration of the operation allowance time 43. A start inhibition pulse 46 is provided for a determined duration $t2$. The start inhibition time 46 starts running when the operation allowance time 43 expires. In this situation, when a readout operation pulse 44 is provided after the expiration of the operation allowance time 46, the operation pulse 45 to the start magnet 18 is provided after the termination of the start inhibition pulse 46.

Thus, in the situation illustrated in FIG. 3, even if the readout operation pulse 44 is provided immediately after the expiration of the operation allowance time 43, at the initiation of the start inhibition pulse 46, so that the armature or extension 34 of the stop magnet 28 has completed its movement under the control of the operation pulse 42 to the stop magnet, the operation pulse 45 to the start magnet 18 is not provided until the elapse of the start inhibition time $t2$. The character in the perforated tape 11 is not read out until a determined time after the expiration of the operation allowance time $t1$. It is thus possible to provide readout of the characters perforated in the perforated tape 11 under completely stable conditions, substantially without vibration, by adjustment of the start inhibition time $t2$.

Figure 4:
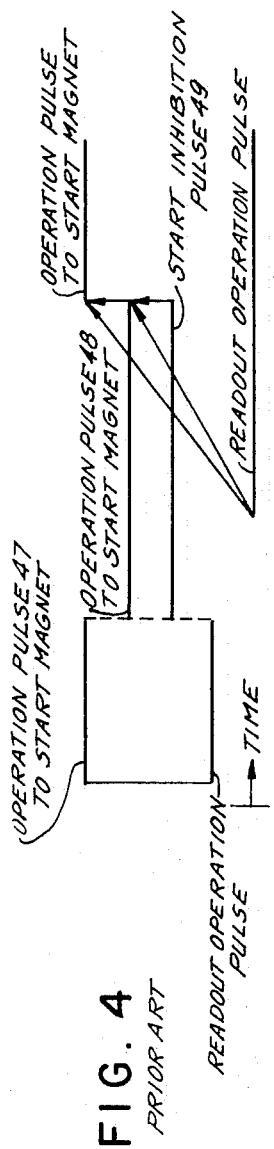
FIG. 4 is a line representation of the operation of a known type of perforated tape readout control system.

FIG. 4 is a line representation of the operation of a known type of perforated tape readout control system. In FIG. 4, the known operation is illustrated. In such operation, as in FIGS. 2 and 3, an operation pulse 47 to the start magnet has been terminated and an operation pulse 48 has been supplied to the stop magnet. A start inhibition pulse 49 is provided for a duration equal to that of the operation pulse 48 to the stop magnet. The start inhibition time 49 starts running when the operation pulse 48 to the stop magnet is initiated and expires when said operation pulse terminates. The start inhibition pulse 49 thus does not cooperate with operation allowance time to provide readout of the perforated characters of the tape 11 under stable conditions substantially without vibration, as in the readout control system of the present invention.

Figure 5:
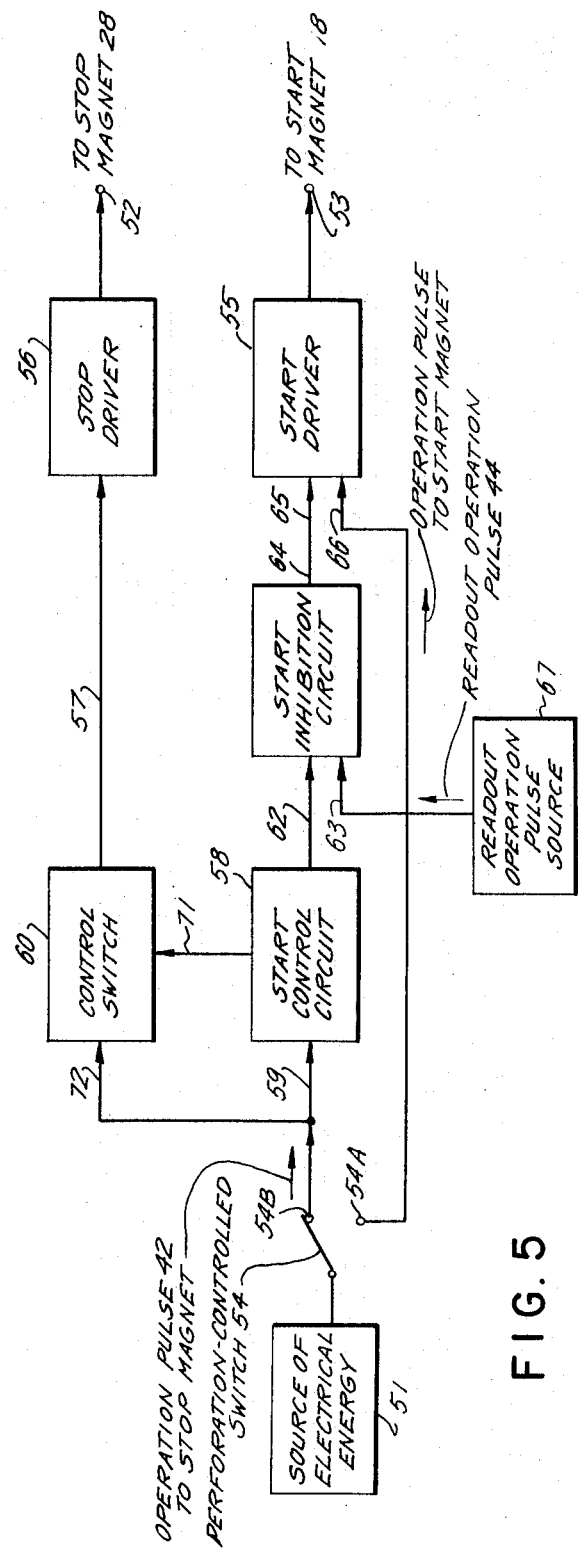
FIG. 5 is a block diagram of an embodiment of the readout control system of the present invention for perforated tape.

FIG. 5 is a block diagram of the readout control system of the present invention. A source 51 of electrical energy provides currents or current pulses suitable for energization of the energization winding of the start magnet 18, which energization winding is connected to an output terminal 52 of the system, and for energization of the energization winding of the stop magnet 28, which energization winding is connected to an output terminal 53 of said system. The source 51 is connected to a perforation-controlled switch 54 which contacts either a contact 54A to supply an operation pulse to the start magnet 18 via a start driver or amplifier or shaper stage 55, or a contact 54B to supply an operation pulse, which is the same as the operation pulse 42 of FIGS. 2 and 3, to the stop magnet 28 via a control switch 60 and a stop driver or amplifier or shaper stage 56.

The driver stages 55 and 56 may comprise any suitable known pulse shaping and amplifying means. The perforation-controlled switch 54 is controlled by the perforations in the tape 11 in a manner whereby when a perforated character in the tape is positioned over or in operative proximity with the readout head 16, the switch 54 makes electrical contact with the contact 54B, as shown in FIG. 5, to provide an operation pulse to the stop magnet 28.

The operation pulse supplied to the contact 54B when the switch 54 is in the position shown in FIG. 5 is not only supplied to the stop driver 56 via the control switch 60 and a line 57, but is supplied to the input of a start control circuit 58 via a line 59. A start inhibition circuit 61 has a first input 62 connected to the output of the start control circuit 58, a second input 63 and an output 64 connected to a first input 65 of the start driver 55. The control switch 60 has an input 71 connected to and is controlled by the start control circuit 58, an input 72 connected to the contact 54B and an output connected to the stop driver 56 via the line 57. The operation pulse from the contact 54A is supplied to a second input 66 of the start driver 55. A readout operation pulse source 67 is connected to the second input 63 of the start inhibition circuit 61 and comprises any suitable known means for supplying a readout operation pulse to said second input.

Each of the start control circuit 58, the control switch 60 and the start inhibition circuit 61 comprise any suitable known logical circuitry for performing the functions ascribed to them. When the operation pulse 42 to the stop magnet is supplied to the start control circuit 58 via the line 59, said start control circuit produces, for the duration $t1$ of the operation allowance time 43, a control signal. The control signal produced by the start control circuit 58 is supplied to the first input 62 of the start inhibition circuit 61 and is for the purpose of providing a start inhibition pulse which is the same as the start inhibition pulse 46 of FIG. 3. If the control signal is supplied to the start inhibition circuit 61 by the start control circuit 58 at the same time that a readout operation pulse, which is the same as the readout operation pulse 44 of FIGS. 2 and 3, is supplied by the readout operation pulse source 67 to the second input 63 of said start inhibition circuit, said start inhibition circuit does not operate and does not supply the start inhibition pulse 46 to the start magnet 18.

The readout control system of the present invention, as illustrated in FIG. 5, functions to provide the operation illustrated in FIG. 2 and in FIG. 3. The control circuit of the readout control system comprises the start control circuit 58, the control switch 60 and the start inhibition circuit 61. The control circuit controls the supply of operation pulses to the start magnet 18 and to the stop magnet 28 to immediately terminate an operation pulse supplied to said stop magnet and to supply an operation pulse to said start magnet and permit operation of the readout operation pulse source 67 to simultaneously read out a character in the perforated tape when a readout operation pulse is produced by said readout operation pulse source during the operation allowance time $t1$ of said stop magnet after an operation pulse supplied to said start magnet is terminated and an operation pulse is supplied to said stop magnet. This is illustrated in FIG. 2.

Furthermore, the control circuit functions to supply an operation pulse to the start magnet 18 and to permit operation of the readout operation pulse source 67 to simultaneously read out a character in the perforated tape 11 after the expiration of a determined period of time after the expiration of the operation allowance time $t1$ of the stop magnet 28 when a readout operation pulse is produced by the readout operation pulse source after the expiration of the operation allowance time. This is illustrated in FIG. 3. The control circuit functions to terminate the operation pulse supplied to the stop magnet 28 by controlling the control switch 60 and opening said switch by any suitable means to prevent the conduction of such operation pulse to said stop magnet. The control switch 60 may comprise any suitable electronic switching means.

After the termination of the control signal produced by the start control circuit 58, the start inhibition pulse 46 provided by the start inhibition circuit 61 is supplied to the start driver 55 for its duration time $t2$, so that even if the readout operation pulse 44 is supplied to the start inhibition circuit 61 during the start inhibition time $t2$ the start driver 55 is maintained in a condition which prevents the transmission of the operation pulse 45 to the start magnet 18. This condition prevails until the expiration of the start inhibition time $t2$.

The operation allowance time $t1$ and the start inhibition time $t2$ are adjustable and are provided by any suitable known means.

While the invention has been described by means of specific examples and in a specific embodiment, we do not wish to be limited thereto, for obvious modifications will occur to those skilled in the art without departing from the spirit and scope of the invention.

We claim:

1. A readout control system for a perforated tape having characters perforated therein, comprising:
  a start magnet positioned in operative proximity with said perforated tape for moving said tape when an operation pulse is supplied thereto;
  a stop magnet positioned in operative proximity with said perforated tape for stopping said tape when an operation pulse is supplied thereto, each of said start magnet and said stop magnet having an operation allowance time commencing when an operation pulse is supplied to said magnet and extending for a determined duration, which operation allowance time is required for complete operation of said magnet;
  readout means positioned in operative proximity with said perforated tape for producing a readout operation pulse and for reading out characters perforated in said perforated tape;
  operation pulse supplying means for selectively supplying an operation pulse to one of said start and stop magnets at a time; and
  control means connected to said operation pulse supplying means for controlling the supply of operation pulses to said mangets to immediately terminate an operation pulse supplied to said stop magnet and to supply an operation pulse to said start magnet and permit operation of said readout means to simultaneously read out a character in said perforated tape when a readout operation pulse is produced by said readout means during the operation allowance time of said stop magnet after an operation pulse supplied to said start magnet is terminated and an operation pulse is supplied to said stop magnet.

2. A readout control system for a perforated tape having characters perforated therein, comprising:
  a start magnet positioned in operative proximity with said perforated tape for moving said tape when an operation pulse is supplied thereto;
  a stop magnet positioned in operative proximity with said perforated tape for stopping said tape when an operation pulse is supplied thereto, each of said start magnet and said stop magnet having an operation allowance time commencing when an operation pulse is supplied to said magnet and extending for a determined duration, which operation allowance time is required for complete operation of said magnet;
  readout means positioned in operative proximity with said perforated tape for producing a readout operation pulse and for reading out characters perforated in said perforated tape;
  operation pulse supplying means for selectively supplying an operation pulse to one of said start and stop magnets at a time; and
  control means connected to said operation pulse supplying means for controlling the supply of operation pulses to said magnets to immediately terminate an operation pulse supplied to said stop magnet and to supply an operation pulse to said start magnet and permit operation of said readout means to simultaneously read out a character in said perforated tape after the expiration of a determined period of time after the expiration of the operation allowance time of said stop magnet when a readout operation pulse is produced by said readout means after the expiration of said operation allowance time of said stop magnet after an operation pulse supplied to said start magnet is terminated and an operation pulse is supplied to said stop magnet.

3. A readout control system for a perforated tape having characters perforated therein, comprising:
  a start magnet positioned in operative proximity with said perforated tape for moving said tape when an operation pulse is supplied thereto;
  a stop magnet positioned in operative proximity with said perforated tape for stopping said tape when an operation pulse is supplied thereto, each of said start magnet and said stop magnet having an operation allowance time commencing when an operation pulse is supplied to said magnet and extending for a determined duration, which operation allowance time is required for complete operation of said magnet;
  readout means positioned in operative proximity with said perforated tape for producing a readout operation pulse and for reading out characters perforated in said perforated tape;
  operation pulse supplying means for selectively supplying an operation pulse to one of said start and stop magnets at a time; and
  control means connected to said operation pulse supplying means for controlling the supply of operation pulses to said magnets to immediately terminate an operation pulse supplied to said stop magnet and to supply an operation pulse to said start magnet and permit operation of said readout means to simultaneously read out a character in said perforated tape when a readout operation pulse is produced by said readout means during the operation allowance time of said stop magnet after an operation pulse supplied to said start magnet is terminated and an operation pulse is supplied to said stop magnet and to supply an operation pulse to said start magnet and permit operation of said readout means to simultaneously read out a character in said perforated tape after the expiration of a determined period of time after the expiration of the operation allowance time of said stop magnet when a readout operation pulse is produced by said readout means after the expiration of said operation allowance time.

4. A readout control system as claimed in claim 3, wherein said control means comprises start control circuit means connected between said operation pulse supplying means and said start magnet and said stop magnet and control switch means connected between said operation pulse supplying means and said stop magnet and controlled by said start control circuit means.

5. A readout control system as claimed in claim 3 wherein said control means comprises start control circuit means having an input connected to said operation pulse supplying means and an output, start inhibition circuit means connected between the output of said start control circuit means and said start magnet and control switch means having an input connected to said start control circuit means, an input connected to said operation pulse supplying means and an output connected to said stop magnet.

6. A readout control system as claimed in claim 5, wherein said readout means has an output connected to said start inhibition circuit means.

7. A method for readout control of a perforated tape having characters perforated therein, comprising the steps of:
  positioning a start magnet in operative proximity with said perforated tape for moving said tape when an operation pulse is supplied thereto;
  positioning a stop magnet in operative proximity with said perforated tape for stopping said tape when an operation pulse is supplied thereto, each of said start magnet and said stop magnet having an operation allowance time commencing when an operation pulse is supplied to said magnet and extending for a determined duration, which operation allowance time is required for complete operation of said magnet;
  producing a readout operation pulse and reading out characters perforated in said perforated tape;
  selectively supplying an operation pulse to one of said start and stop magnets at a time; and
  controlling the supply of operation pulses to said magnets to immediately terminate an operation pulse supplied to said stop magnet and to supply an operation pulse to said start magnet and permit simultaneous readout of a character in said perforated tape when a readout operation pulse is produced during the operation allowance time of said stop magnet after an operation pulse supplied to said start magnet is terminated and an operation pulse is supplied to said stop magnet.

8. A method for readout control of a perforated tape having characters perforated therein, comprising the steps of:

positioning a start magnet in operative proximity with said perforated tape for moving said tape when an operation pulse is supplied thereto;

positioning a stop magnet in operative proximity with said perforated tape for stopping said tape when an operation pulse is supplied thereto, each of said start magnet and said stop magnet having an operation allowance time commencing when an operation pulse is supplied to said magnet and extending for a determined duration, which operation allowance time is required for complete operation of said magnet;

producing a readout operation pulse and reading out characters perforated in said perforated tape;

selectively supplying an operation pulse to one of said start and stop magnets at a time; and controlling the supply of operation pulses to said magnets to immediately terminate an operation pulse supplied to said stop magnet and to supply an operation pulse to said start magnet and permit simultaneous readout of a character in said perforated tape after the expiration of a determined period of time after the expiration of the operation allowance time of said stop magnet when a readout operation pulse is produced after the expiration of said operation allowance time of said stop magnet after an operation pulse supplied to said start magnet is terminated and an operation pulse is supplied to said stop magnet.

9. A method for readout control of a perforated tape having characters perforated therein, comprising the steps of:

positioning a start magnet in operative proximity with said perforated tape for moving said tape when an operation pulse is supplied thereto;

positioning a stop magnet in operative proximity with said perforated tape for stopping said tape when an operation pulse is supplied thereto, each of said start magnet and said stop magnet having an operation allowance time commencing when an operation pulse is supplied to said magnet and extending for a determined duration, which operation allowance time is required for complete operation of said magnet;

producing a readout operation pulse and reading out characters perforated in said perforated tape;

selectively supplying an operation pulse to one of said start and stop magnets at a time; and controlling the supply of operation pulses to said magnets to immediately terminate an operation pulse supplied to said stop magnet and to supply an operation pulse to said start magnet and permit simultaneous readout of a character in said perforated tape when a readout operation pulse is produced during the operation allowance time of said stop magnet after an operation pulse supplied to said start magnet is terminated and an operation pulse is supplied to said stop magnet and to supply an operation pulse to said start magnet and permit simultaneous readout of a character in said perforated tape after the expiration of a determined period of time after the expiration of the operation allowance time of said stop magnet when a readout operation pulse is produced after the expiration of said operation allowance time.

References Cited

UNITED STATES PATENTS

| | | | |
|---|---|---|---|
| 3,064,887 | 11/1962 | Waters et al. | 235—61.11 |
| 2,401,021 | 5/1946 | Rosenberg et al. | 235—61.11 X |
| 2,438,883 | 3/1948 | Tolson | 235—61.11 X |

DARYL W. COOK, *Primary Examiner.*